United States Patent
Bougiouris

[11] 3,739,687
[45] June 19, 1973

[54] MACHINE FORMING TEETH AT BOTH FACES AND THE PERIPHERY OF A ROTARY BLANK

[75] Inventor: Evangelos Bougiouris, Worcester, Mass.

[73] Assignee: John Sagarian, Auburn, Mass.

[22] Filed: Jan. 28, 1972

[21] Appl. No.: 221,547

[52] U.S. Cl. ............... 90/15.1 R, 90/DIG. 7, 51/52
[51] Int. Cl. .............................................. B23c 3/36
[58] Field of Search ............ 90/15.1 R, 9.6, DIG. 7, 90/11 R; 51/52

[56] References Cited
UNITED STATES PATENTS
1,865,198  6/1932  Marsilius .............................. 90/15.1
1,472,852  11/1923  Muller ................................. 90/15.1

Primary Examiner—Gil Weidenfeld
Attorney—Charles R. Fay

[57] ABSTRACT

An automatic machine for forming cutting teeth in a rotary blank, said machine including three separately operated rotary cutters, and means for driving and reciprocating them in timed relation, two of the cutters operating on the blank at opposite side faces thereof, said side faces being convergeant, and the third cutter operating on the peripheral edge of the blank; together with indexing means for the rotary blank after the completion of each of the three part teeth.

15 Claims, 7 Drawing Figures

MACHINE FORMING TEETH AT BOTH FACES AND THE PERIPHERY OF A ROTARY BLANK

BACKGROUND OF THE INVENTION

There has always been a time consuming substantially hand operation procedure necessary to cut the series of three teeth in rotary cutters having an axis, two cutting faces at an acute angle with respect to each other and being convergeant outwardly from the center toward the periphery, said two faces being spaced at the periphery by a third cutting face which is circumferential and located generally at an obtuse angle relative to the two convergeant cutting faces.

A cutter of this nature cuts on three sides at the same time when a workpiece parallel to the axis of the cutter is approached in a radial direction. In the past these teeth have been cut one at a time as for instance on a hand milling machine, or one series at a time, and this of course requires three separate operations to cut teeth on the three cutting faces described above. This is a long time consuming proposition and renders these cutters very expensive, and it is the primary object of the present invention to provide an automatic machine for cutting each of the three cutting faces at once substantially simultaneously, and indexing the blank between the blank between the cuts.

SUMMARY OF THE INVENTION

Three separately operated rotary reciprocated cutters are utilized, and they operate to cut the three teeth at circumferentially spaced areas on the blank which is provided with means to index it after each reciprocation of the three cutter heads to form one tooth each.

Assuming that the blank is positioned in a horizontal manner, i.e., on a vertical axis, a pair of reciprocatory rotating cutters are arranged to move generally radially with respect to the blank at circumferentially spaced points and at a slight angle with respect to the horizontal, one of said cutters moving slantingly downward and the other one moving slantingly upward cutting a groove at opposite faces of the blank to form a tooth; and there being a third reciprocatory rotary cutter which moves in a direction substantially parallel to the axis of the blank cutting the circumferential tooth at a still different circumferentially spaced location with respect to the blank.

The device which holds the cutter blank in position to be cut as aforesaid is provided with an automatically actuating index and lock means which operates upon the retraction of all three of the cutter heads so as to present the next increment for the next three part cut.

The operating cutters are held in chucks which are provided with rotatively adjustable supports to vary the angle at which the cutter heads approach the blank. One cutter may form the teeth at a right angle to the axis of the blank if desired. Various safety means are provided for stopping the machine upon a malfunction of any one of the three cutter heads, etc. All the operator has to do is to load the work blank onto the indexable shaft provided therefor, start the machine, and unload the finished cutter after it has been indexed the full 360°.

PREFERRED EMBODIMENT OF THE INVNETION

Figure 1:
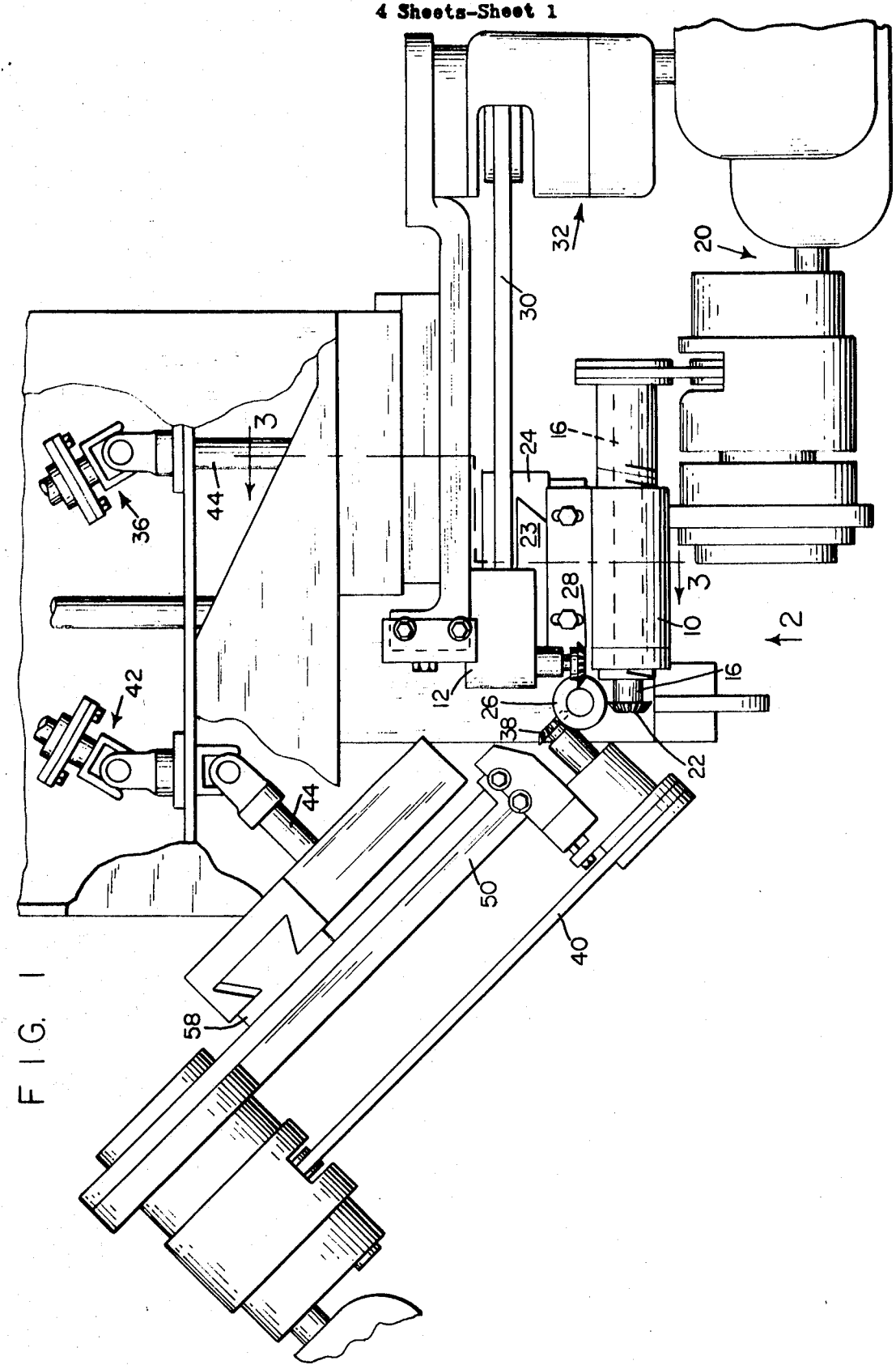
FIG. 1 is a top plan view of the entire machine.
Figure 3:
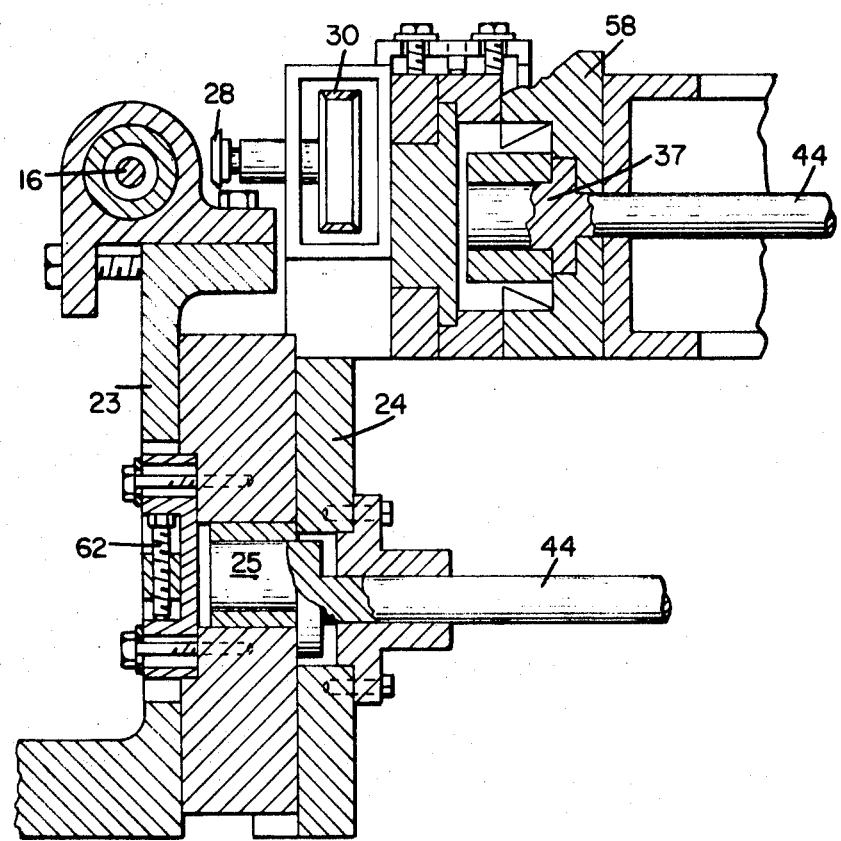
FIG. 3 is an enlarged section on line 3—3 of FIG. 1.

In FIG. 1 the three cutter heads and their driving mechanisms are shown and these cutter heads are indicated at 10, 12, and 14. The cutter head 10 has a shaft 16 driven as by a belt or the like 18 from a geared head motor generally indicated at 20, cutter 22 being mounted on shaft 16 to be rotated thereby. The cutter head is mounted on a support 23. This whole assembly is adapted to reciprocate vertically on the ways 24 by a crank or the like 25, see FIG. 3. The cutter is shown as e.g., beveled, and as it reciprocates it cuts a groove or tooth in the periphery of the horizontally disposed circular blank indicated at 26.

Cutter head 12 is reciprocated right to left in FIG. 1 and rotary cutter 28 thereon is driven by belt 30 from a geared head motor at 32. The entire assembly is reciprocated through an adjustable coupling device 36 driving a crank or cam 37, like that at 25.

The third cutter head 14 has a rotary cutter 38 and it is driven by a belt 40 equivalent to that at 30 and powered by the same kind of a mechanism through an adjustable coupling device 42 equivalent to that at 36. All the cutters are mounted on substantially horizontal axes, and the crank 25 also has a coupling device not shown like those at 36 and 42. In each case, each coupling device drives a shaft 44, 44 that in turn drives the crank or similar device to reciprocate the three heads independently but in timed relation.

The cutter 28, as it reciprocates, cuts a groove in one face of the blank 26, which may be on a slight angle with respect to the horizontal. At the same time the cutter 36 is cutting the opposite face of the blank at a circumferentially spaced point thereon, cutter 36 being reciprocated along a line at a slight angle relative to the path of cutter 28. In the case shown, the cutter 28 is cutting the top or exposed face of the blank 26 while the cutter 36 is performing a similar operation at the under side thereof. The cutter 22 being vertically reciprocable, cuts at the periphery of the blank 26, the three cutters 22, 26, and 36 thereby producing a circular, rotary cutter having the three cutting faces described above.

Figure 2:
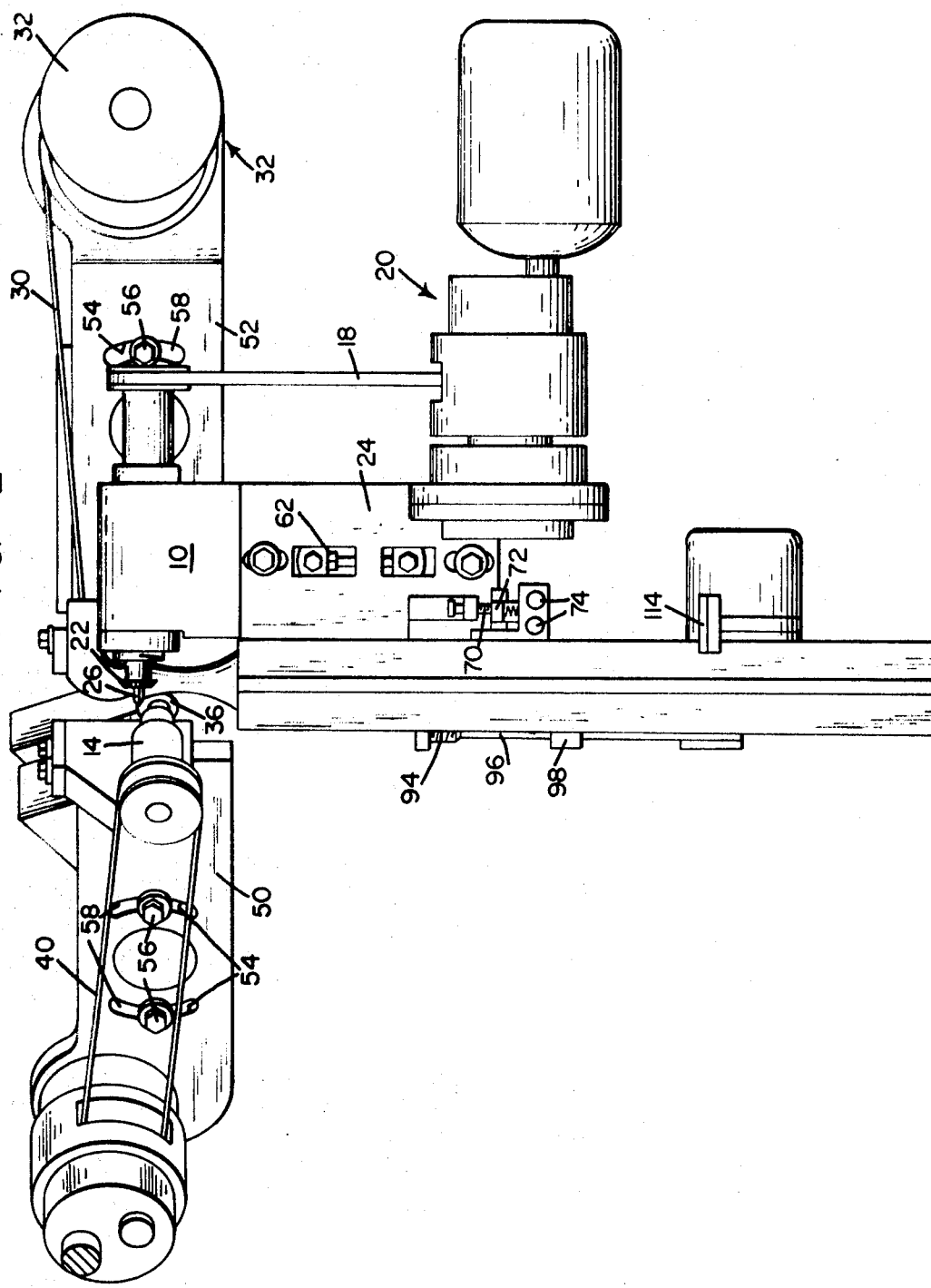
FIG. 2 is a view in front elevation thereof looking in the direction of arrow 2 in FIG. 1.

Referring now to FIG. 2 it will be seen that belts 30 and 40 extend between the respective motors and the respective cutter heads rotating the cutters, and the entire assemblies are mounted on rotatably adjustable supports shown at 50, 52, each having the curved slots 54 to provide the adjustments and securing bolts 56 extend through the slots and into the non-rotary supports 58, 58. The cutter head 24 which reciprocates vertically can be adjusted as to position and location by the various holding nuts and bolts as at 62, FIG. 2, and the vertical positions of cutters 28 and 36 are adjustable also.

Figure 4:
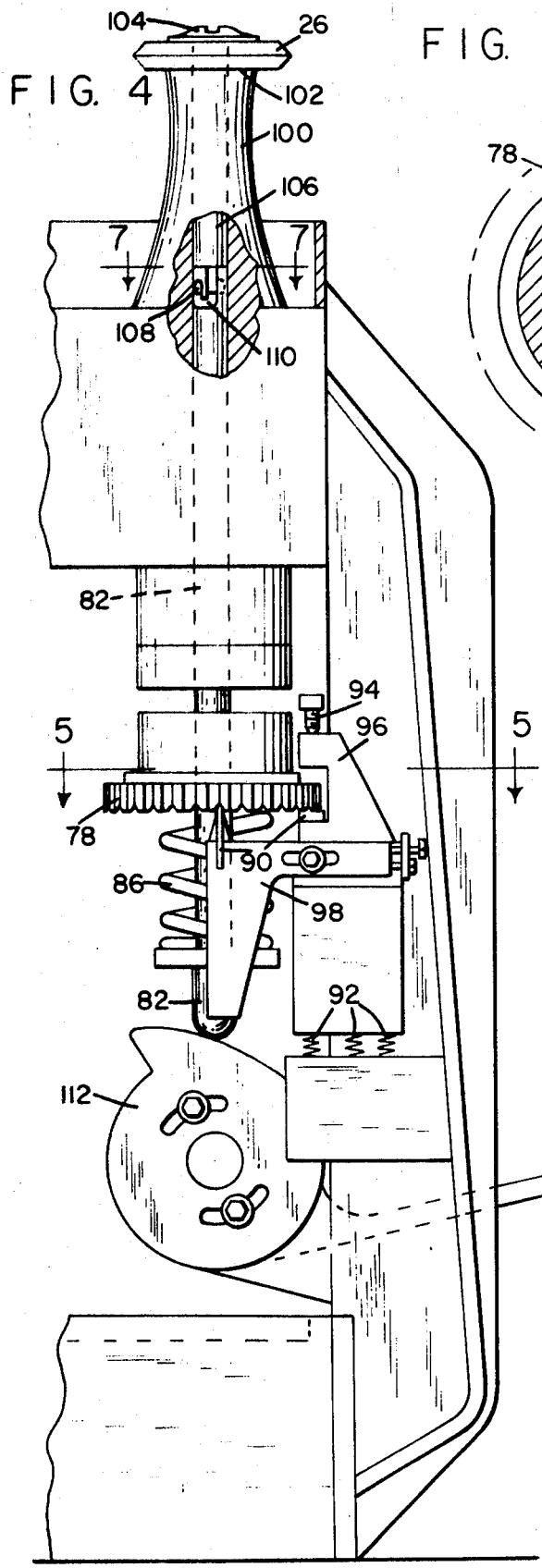
FIG. 4 is a detail view illustrating the manner of holding and indexing the cutter blank; and looking in the direction of arrow 4 in FIG. 2.
Figure 6:
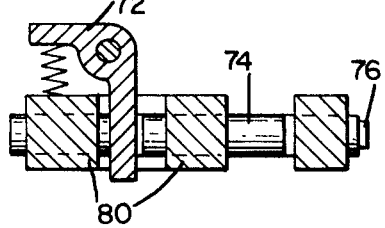
FIG. 6 is a section on line 6—6 of FIG. 5.
Figure 7:
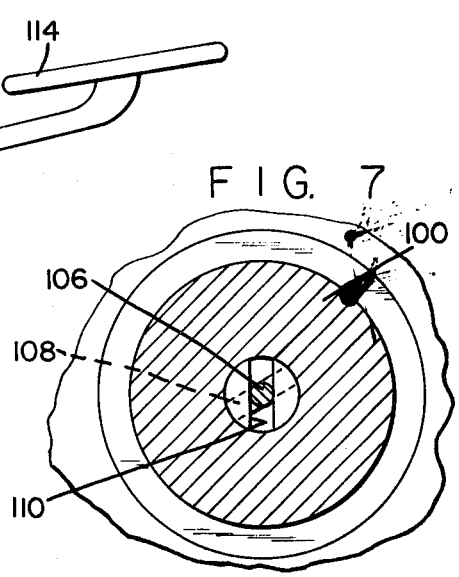
FIG. 7 is a sectional view on line 7—7 of FIG. 4.

As the member 23 reaches its lowermost position, an adjustable stop thereon as at 70 strikes a drive member 72 which may be in the form of spring return bell crank or the like. Looking at FIG. 6 it will be seen that this will urge shafts 74 for feed pawls 76 to move them in the appropriate direction to index the indexing gear generally indicated at 78 in FIG. 4. The feed pawl shafts are mounted in a support generally indicated at 80, in turn mounted on the frame of the machine.

Figure 5:
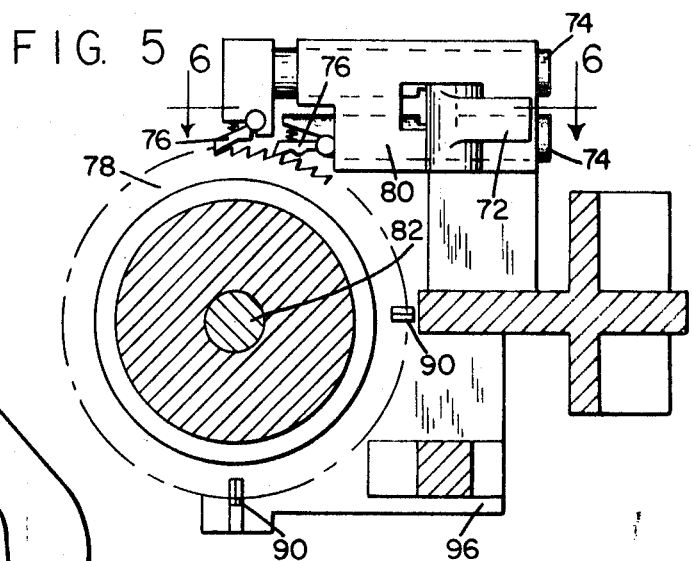
FIG. 5 is a sectional view on line 5—5 of FIG. 4, illustrating the indexing mechanism and drive for the indexing pawls.

Depending on the length of stroke of the pawl shafts 74, one only of the pawls is operative to index the index gear 78, but if e.g., it is desired to double the number of teeth on blank 26, the pawl shafts are actuated one-half the distance used before, and each one of the two pawls 76, FIG. 5, makes a step, while the other is idle. This condition is shown in FIG. 5. The adjustment of the length of throw of the pawl shafts is accomplished by the adjustable stop 70. More than two pawls can be used, if desired.

The index gear 78 is attached to the blank holding shaft 82 and turns it under influence of the feed pawls, themselves spring returned, in order to turn the blank 26 for the next cut, at each reciprocation of support 23.

The indexing gear 78 is held upwardly by means of a spring 86 and is locked in position by positive locks indicated at 90. These locks retract downwardly relative to the gear 78 at each stroke but return under influence of springs 92, FIG. 4. In order to ensure that the indexing gear does not slip or change position during the cutting operation.

Mounted on support 23 is an adjustable screw 94 that reciprocates therewith, and intermittently depresses a support 96 for the adjustable lock holder 98 to free the index gear in timed relation to the actuation of the pawls 76 so that the index gear can be indexed, and upon upward motion of support 23, the locks once again immobilize the index gear under influence of springs 92.

A fixed barrel or the like 100 has a flat top at 102 on which the blank 26 sets. A top clamp 104 has a shaft 106 extending down through the barrel terminating in a cross pin 108 having a rotational connection with a bayonet slot 110 at the upper end of shaft 82. Shaft 82 bottoms on an adjustable eccentric 112, and is itself held down by spring 86.

When the blank is to be changed, the operator steps on pedal 114, turning eccentric 112 in a clockwise direction, and consequently raising shafts 82 and 106 and clamp 104. The latter can now be grasped and turned and removed, with shaft 106; and the finished work is removed and replaced by a fresh blank.

I claim:

1. In a machine for forming cutting teeth on a rotary blank at both sides of the blank and at the circumferential edge thereof,
   means to hold the blank, means to index the blank, a pair of rotary cutters, cutter heads therefor, means to drive the cutters and means to reciprocate the cutter heads, said cutters being constructed and arranged to operate only on opposite side surfaces of the cutter blank in a generally radial direction with respect thereto, whereby one of said cutters cuts at one side surface of the blank and the other cutter cuts at the opposite side surface of the blank,
   and a third cutter head, a cutter therefor, means to drive the third cutter and means to reciprocate the third cutter head in a direction substantially at right angles with respect to the lines of reciprocation of the first two cutter heads, said third cutter being constructed and arranged to cut on the periphery of the blank and along a line generally parallel to the axis of the cutter blank.

2. The machine of claim 1 including means operating said cutter heads to reciprocate them substantially simultaneously.

3. The machine of claim 1 wherein said cutters and cutter heads are arranged in circumferentially spaced relation about the cutter blank holding means, whereby each cutter operates at a different location on the cutter blank.

4. The machine of claim 1 including means for rotatably adjusting the cutter heads to provide for a variation of angle at which the cutter heads approach and operate on the cutter blank.

5. The machine of claim 1 wherein at least one of the first two mentioned cutter heads reciprocates along a line at a slight inclination with respect to the horizontal.

6. The machine of claim 1 wherein both of the first two named cutter heads are located and positioned to reciprocate along lines at an inclination with respect to the general plane of the cutter blank.

7. The machine of claim 1 wherein both of the first two named cutter heads are located and positioned to reciprocate along lines at an inclination with respect to the general plane of the cutter blank, said two first-named cutters operating at different angles, one of them moving relatively upwardly along the face of the cutter blank and the other one moving generally downwardly along the face of the cutter blank, the cutter blank itself having convergeant side faces and the first two named cutters moving parallel thereto on its respective color blank surface.

8. The machine of claim 1 wherein the relationship of the respective reciprocatory paths of the respective cutter heads are arranged at mutually circumferentially spaced relationship around the blank, so that they operate at different points on the blank, whereby after a complete 360° index of the cutter blank teeth are formed, each tooth having corresponding lands and grooves at each side surface or face of the cutter blank and at the peripheral edge thereof.

9. The machine of claim 1 wherein the means to index the blank comprises a rotary toothed wheel, drive pawls therefor, and means operating the drive pawls in timed relation with respect to the reciprocation of one of said cutter heads.

10. The machine of claim 1 wherein the means to index the blank comprises a rotary toothed wheel, drive pawls therefor, and means operating the drive pawls in timed relation with respect to the reciprocation of one of said cutter heads, a blank holding shaft, means for clamping the blank to the shaft, the index gear being secured to said shaft.

11. The machine of claim 1 wherein the means to index the blank comprises a rotary toothed wheel, drive pawls therefor, and means operating the drive pawls in timed relation with respect to the reciprocation of one of said cutter heads, and manual means for releasing the blank for removal thereof.

12. The machine of claim 1 wherein the means to hold the blank comprises a shaft, a clamp on the shaft, a fixed barrel, the shaft extending through the barrel, a second shaft, a releasable connection between the two shafts, means holding the clamp to the blank and thereby the blank to the barrel, and means to raise the two shafts and the clamp from blank clamping position to release the blank.

13. The machine of claim 1 wherein the means to index the blank comprises an index gear connected to the means to hold the blank, a pawl to index the index gear, and means to actuate the pawl at each reciprocation of one of the cutter heads.

14. The machine of claim 1 wherein the means to index the blank comprises an index gear connected to the means to hold the blank, a pawl to index the index gear, and means to actuate the pawl at each reciprocation of one of the cutter heads, means to lock the index gear against motion during the cutting strokes of the cutter heads, and means to retract the lock at each reciprocation of one of the cutter heads to permit indexing the index gear.

15. The machine of claim 1 wherein the means to index the blank comprises an index gear connected to the means to hold the blank, a plurality of pawls to index the index gear, and means to actuate the pawls at each reciprocation of one of the cutter heads, said pawls operating one at a time in sequence.

* * * * *